US012695172B2

(12) United States Patent
Herbsommer

(10) Patent No.: US 12,695,172 B2

(45) **Date of Patent: *Jul. 28, 2026**

(54) MICROELECTRONIC DEVICE PACKAGE WITH INTEGRATED ANTENNA

(71) Applicant: Texas Instruments Incorporated, Dallas, TX (US)

(72) Inventor: Juan Alejandro Herbsommer, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,918

(22) Filed: Apr. 9, 2024

(65) Prior Publication Data

US 2024/0258683 A1 Aug. 1, 2024

Related U.S. Application Data

(63) Continuation of application No. 17/515,315, filed on Oct. 29, 2021, now Pat. No. 11,955,692.

(51) Int. Cl.

*H01Q 1/22* (2006.01)

*H01Q 1/36* (2006.01)

(Continued)

(52) U.S. Cl.

CPC ........... *H01Q 1/2283* (2013.01); *H01Q 1/364* (2013.01); *H01Q 1/46* (2013.01); *H01Q 9/065* (2013.01)

(58) Field of Classification Search

CPC ........ H01Q 1/2283; H01Q 1/364; H01Q 1/46; H01Q 9/045; H01Q 21/56; H01Q 21/563;

(Continued)

(56) References Cited

U.S. PATENT DOCUMENTS

| | | | | |
|---|---|---|---|---|
| 7,372,408 B2 * | 5/2008 | Gaucher | .................. | H01Q 1/40<br>343/700 MS |
| 2007/0164907 A1 | 7/2007 | Gaucher et al. | | |

(Continued)

FOREIGN PATENT DOCUMENTS

| | | | | |
|---|---|---|---|---|
| CN | 109244641 A | 1/2019 | | |
| CN | 111180422 A * | 5/2020 | ............. | H01L 21/56 |
| DE | 102016114482 A1 | 8/2016 | | |

OTHER PUBLICATIONS

German Patent and Trademark Office, Office Action mailed Apr. 16, 2025, 5pgs.

*Primary Examiner* — Alexander H Taningco

(74) *Attorney, Agent, or Firm* — Xiaotun Qiu; Frank D. Cimino

(57) ABSTRACT

A described example includes: a semiconductor die mounted to a die pad of a package substrate, the semiconductor die having bond pads on a device side surface facing away from the die pad; bond wires coupling the bond pads of the semiconductor die to leads of the package substrate, the leads spaced from the die pad; an antenna positioned over the device side surface of the semiconductor die and having a feed line coupled between the antenna and a device side surface of the semiconductor die; and mold compound covering the semiconductor die, the bond wires, a portion of the leads, and the die side surface of the die pad, a portion of the antenna exposed from the mold compound.

18 Claims, 14 Drawing Sheets

(51) Int. Cl.
*H01Q 1/46* (2006.01)
*H01Q 9/06* (2006.01)

(58) Field of Classification Search
CPC ............... H01Q 23/28; H01Q 23/3157; H01Q 23/49861; H01Q 2224/04105; H01Q 2224/12105; H01Q 2924/181; H01Q 2933/005
See application file for complete search history.

(56) References Cited

U.S. PATENT DOCUMENTS

| | | | | |
|---|---|---|---|---|
| 2007/0170560 | A1* | 7/2007 | Gaucher | H01Q 23/00 257/676 |
| 2009/0195464 | A1 | 8/2009 | Gaucher et al. | |
| 2017/0062298 | A1 | 3/2017 | Auchere et al. | |
| 2017/0125881 | A1* | 5/2017 | Mangrum | H01Q 9/0421 |
| 2018/0006358 | A1 | 1/2018 | Gottwald et al. | |
| 2021/0075081 | A1* | 3/2021 | Kamphuis | H01Q 1/3233 |

* cited by examiner

MICROELECTRONIC DEVICE PACKAGE WITH INTEGRATED ANTENNA

This application is a continuation to U.S. patent application Ser. No. 17/515,315, filed Oct. 29, 2021, the contents of which are herein incorporated by reference in its entirety.

TECHNICAL FIELD

This relates generally to packaging microelectronic devices, and more particularly to antennas integrated within microelectronic device packages.

BACKGROUND

Processes for producing microelectronic device packages include mounting a semiconductor die to a package substrate, and covering the electronic devices with a dielectric material such as a mold compound to form packaged devices.

Incorporating antennas with semiconductor devices in a microelectronic device package is desirable. Antennas are increasingly used with microelectronic and portable devices, such as communications systems, communications devices including 5G or LTE cellphones and smartphones, and in automotive systems such as radar. Mold compound used in molded devices and some substrate materials used with semiconductor devices are dielectric materials that have high dielectric constants of about 3 or higher, which can interfere with the efficiency of antennas. Systems using antennas with packaged semiconductor devices often place the antennas on a printed circuit board, an organic substrate, spaced from the semiconductor devices. These approaches require additional elements, including expensive circuit board substrates, which are sometimes used inside a module with semiconductor dies, or sometimes used with packaged semiconductor devices spaced apart from the antennas. These solutions are relatively high cost and require substantial area. Forming efficient antennas within microelectronic device packages remains challenging.

SUMMARY

In a described example, an apparatus includes: a semiconductor die mounted to a die pad of a package substrate, the semiconductor die having bond pads on a device side surface facing away from the die pad; bond wires coupling the bond pads of the semiconductor die to leads of the package substrate, the leads spaced from the die pad; an antenna positioned over the device side surface of the semiconductor die and having a feed line coupled between the antenna and a device side surface of the semiconductor die; and mold compound covering the semiconductor die, the bond wires, a portion of the leads, and the die side surface of the die pad, a portion of the antenna exposed from the mold compound.

DETAILED DESCRIPTION

Figure 1:
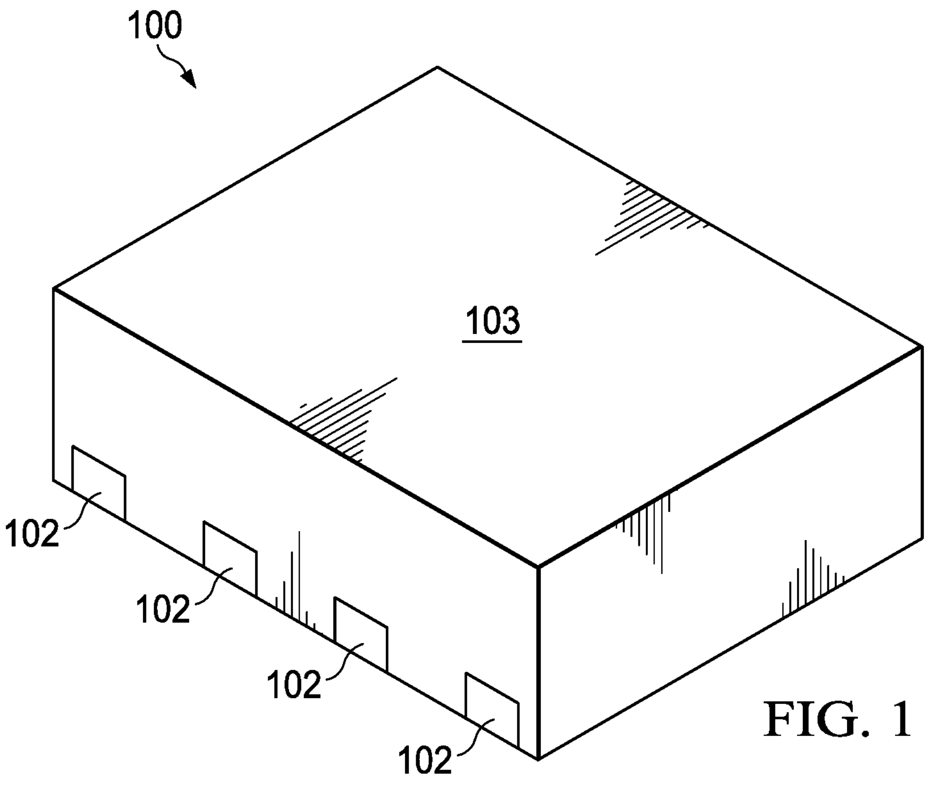
FIG. 1 illustrates in a projection view a small outline no lead (SON) package.

Corresponding numerals and symbols in the different figures generally refer to corresponding parts, unless otherwise indicated. The figures are not necessarily drawn to scale.

Elements are described herein as "coupled." The term "coupled" includes elements that are directly connected and elements that are indirectly connected, and elements that are electrically connected even with intervening elements or wires are coupled.

The term "semiconductor die" is used herein. A semiconductor die can be a discrete semiconductor device such as a bipolar transistor, a few discrete devices such as a pair of power FET switches fabricated together on a single semiconductor die, or a semiconductor die can be an integrated circuit with multiple semiconductor devices such as the multiple capacitors in an A/D converter. The semiconductor die can include passive devices such as resistors, inductors, filters, sensors, or active devices such as transistors. The semiconductor die can be an integrated circuit with hundreds or thousands of transistors coupled to form a functional circuit, for example a microprocessor or memory device.

The term "microelectronic device package" is used herein. A microelectronic device package has at least one semiconductor die electrically coupled to terminals, and has a package body that protects and covers the semiconductor die. The microelectronic device package can include additional elements, in some arrangement an integrated antenna is included. Passive components such as capacitors, resistors, and inductors or coils can be included. In some arrangements, multiple semiconductor dies can be packaged together. For example, a power metal oxide semiconductor (MOS) field effect transistor (FET) semiconductor die and a logic semiconductor die (such as a gate driver die or a controller die) can be packaged together to from a single packaged electronic device. The semiconductor die is mounted to a package substrate that provides conductive leads, a portion of the conductive leads form the terminals for the packaged device. The semiconductor die can be mounted to the package substrate with a device side surface facing away from the substrate and a backside surface facing and mounted to a die pad of the package substrate. In wire bonded semiconductor device packages, bond wires couple conductive leads of a package substrate to bond pads on the semiconductor die. The semiconductor device package can have a package body formed by a thermoset epoxy resin in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions provide the terminals for the semiconductor device package.

The term "package substrate" is used herein. A package substrate is a substrate arranged to receive a semiconductor die and to support the semiconductor die in a completed semiconductor device package. Package substrates useful with the arrangements include conductive lead frames, which can be formed from copper, aluminum, stainless steel, steel and alloys such as Alloy 42 and copper alloys. The lead frames can include a die pad with a die side surface for mounting a semiconductor die, and conductive leads arranged near and spaced from the die pad for coupling to bond pads on the semiconductor die using wire bonds, ribbon bonds, or other conductors. The lead frames can be provided in strips or arrays. The conductive lead frames can be provided as a panel with strips or arrays of unit device portions in rows and columns. Semiconductor dies can be placed on respective unit device portions within the strips or arrays. A semiconductor die can be placed on a die pad for each packaged device, and die attach or die adhesive can be used to mount the semiconductor dies to the lead frame die pads. In wire bonded packages, bond wires can couple bond pads on the semiconductor dies to the leads of the lead frames. The lead frames may have plated portions in areas designated for wire bonding, for example silver plating can be used. After the bond wires are in place, a portion of the package substrate, the semiconductor die, and at least a portion of the die pad can be covered with a protective material such as a mold compound.

A package substrate, such as a lead frame, will have conductive portions on a die side surface. Leads of a metal lead frame are conductive all along the surfaces, while for other substrate types, conductive lands in dielectric substrate material are arranged for connecting to the semiconductor die. Platings to enhance bond wire adhesion, prevent corrosion and tarnish, and increase reliability can be used on leads of conductive lead frames. Spot plating or overall plating can be used.

In packaging semiconductor devices, mold compound may be used to partially cover a package substrate, to cover the semiconductor die, and to cover the electrical connections from the semiconductor die to the package substrate. This can be referred to as an "encapsulation" process, although some portions of the package substrates are not covered in the mold compound during encapsulation, for example terminals and leads are exposed from the mold compound. Encapsulation is often a compressive molding process, where thermoset mold compound such as resin epoxy can be used. A room temperature solid or powder mold compound can be heated to a liquid state and then molding can be performed by pressing the liquid mold compound into a mold. Transfer molding can be used. Unit molds shaped to surround an individual device may be used, or block molding may be used, to form the packages simultaneously for several devices from mold compound. The devices can be provided in an array of several, hundreds or even thousands of devices in rows and columns that are molded together.

After the molding, the individual packaged devices are cut from each other in a sawing operation by cutting through the mold compound and package substrate in saw streets formed between the devices. Portions of the package substrate leads are exposed from the mold compound package to form terminals for the packaged semiconductor device.

The term "antenna gang frame" is used herein. An antenna gang frame is a frame, similar to a lead frame, that provides an array of antennas in rows and columns positioned in correspondence with semiconductor dies that are to be mounted on a package substrate. In the arrangements, the antenna gang frame is placed over the device side surface of the semiconductor dies, and the antennas are placed in contact with the semiconductor dies. After molding, the antenna gang frame is cut along saw streets to separate the antennas from the antenna gang frame, providing an integrated antenna for each semiconductor die.

The term "scribe lane" is used herein. A scribe lane is a portion of semiconductor wafer between semiconductor dies. Sometimes in related literature the term "scribe street" is used. Once semiconductor processing is finished and the semiconductor devices are complete, the semiconductor devices are separated into individual semiconductor dies by severing the semiconductor wafer along the scribe lanes. The separated dies can then be removed and handled individually for further processing. This process of removing dies from a wafer is referred to as "singulation" or sometimes referred to as "dicing." Scribe lanes are arranged on four sides of semiconductor dies and when the dies are singulated from one another, rectangular semiconductor dies are formed.

The term "saw street" is used herein. A saw street is an area between molded electronic devices used to allow a saw, such as a mechanical blade, laser or other cutting tool to pass between the molded electronic devices to separate the devices from one another. This process is another form of singulation. When the molded electronic devices are provided in a strip with one device adjacent another device along the strip, the saw streets are parallel and normal to the length of the strip. When the molded electronic devices are provided in an array of devices in rows and columns, the saw streets include two groups of parallel saw streets, the two groups are normal to each other and the saw will traverse the molded electronic devices in two different directions to cut apart the packaged electronic devices from one another in the array.

The term "quad flat no-lead" or "QFN" is used herein for a type of electronic device package. A QFN package has conductive leads that are coextensive with the sides of a molded package body, and in a quad package the leads are on four sides. Alternative flat no-lead packages may have leads on two sides or only on one side. These can be referred to as "small outline no-lead" or "SON" packages. No-lead packaged electronic devices can be surface mounted to a board. Leaded packages can be used with the arrangements where the leads extend away from the package body and are shaped to form a portion for soldering to a board. A dual in line package (DIP) can be used with the arrangements. A small outline package (SOP) can be used with the arrangements. Small outline no-lead (SON) packages can be used, and a small outline transistor (SOT) package is a leaded package that can be used with the arrangements. Leads for leaded packages are arranged for solder mounting to a board. The leads can be shaped to extend towards the board, and form a mounting surface. Gull wing leads, J-leads, and other lead shapes can be used. In a DIP package, the leads end in pin shaped portions that can be inserted into conductive holes formed in a circuit board, and solder is used to couple the leads to the conductors within the holes.

In the arrangements, a microelectronic device package includes a semiconductor die mounted to a package substrate. The package substrate can be a conductive lead frame. The package substrate has a die pad for mounting a semiconductor die. The backside surface of the semiconductor die is attached to the die pad, with the device side surface of the semiconductor die facing away from the die pad and away from a backside surface of the die pad. Electrical connections are made between bond pads on a device side surface of the semiconductor die and leads on the package substrate. The electrical connections can be bond wires, or ribbon bonds. After the electrical connections are formed, an antenna gang frame including an antenna positioned over the semiconductor die is mounted to the device side surface of the semiconductor dies. The antennas can be coupled to ports on the device side surface of the respective semiconductor dies by solder joints. The semiconductor dies, the electrical connections, the antennas, and portions of the package substrate are encapsulated in mold compound to form a microelectronic device package. The antennas are shaped so that a portion of the antennas is exposed from the mold compound at a surface of the package body formed by the mold compound. The packaged devices are singulated by sawing through the mold compound, the antenna gang frame, and the lead frame in saw streets between the packaged semiconductor devices. The die pad and the leads of the package can be soldered in a thermal reflow process to make electrical connections and mechanical connections to a circuit board. Because a portion of the antennas is exposed from the mold compound, the antennas can efficiently launch and detect electromagnetic signals, for example including signals at frequencies in the RF and millimeter wave ranges. In an example an antenna is configured to operate between 30 and 300 GHz, in the millimeter range, having wavelengths in air between 10 and 1 millimeters Other frequency signals such as RF signals can be transmitted or received by the integrated antennas.

FIG. 1 illustrates, in a projection view, a semiconductor device package 100, illustrated in a small outline no lead (SON) package. SON packages are one type of semiconductor device package that is useful with the arrangements. Other package types including leaded and no lead packages can be used. The semiconductor device package 100 has a body formed from a mold compound 103, for example a thermoset epoxy resin. Other mold compounds can be used including resins, epoxies, or plastics. Terminals 102 are part of a package substrate 109 (not visible in FIG. 1, see FIG. 2) that supports a semiconductor die 105 (not visible in FIG. 1, as it is obscured by the package body, see FIG. 2) within the package 100, the terminals 102 are portions of leads of the package substrate that are exposed from the mold compound 103. The semiconductor device package 100 can be mounted to a circuit board or module using surface mount technology (SMT). Sizes for packaged electronic devices are continually decreasing, and currently can be several millimeters on a side to less than one millimeter on a side, although larger and smaller sizes are also used. Future package sizes may be smaller.

Figure 2:
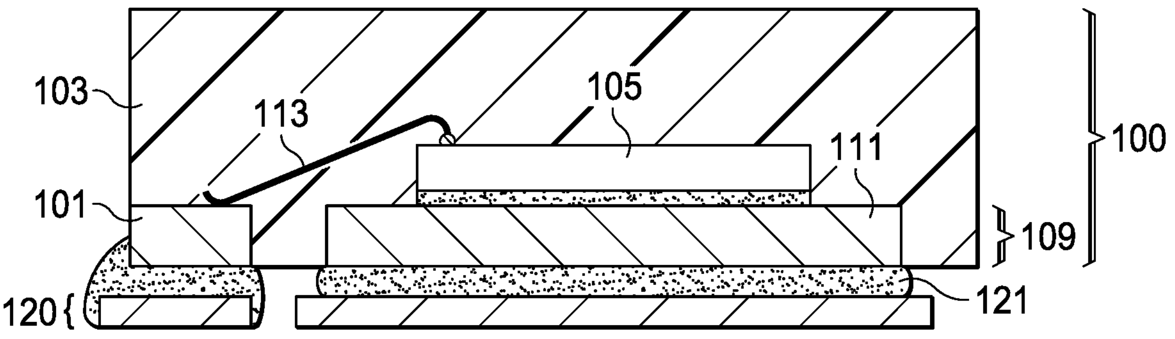
FIG. 2 illustrates, in a cross sectional view, an SON package mounted to a circuit board.

FIG. 2 illustrates in a cross sectional view a semiconductor die 105 mounted to a die pad 111 on a package substrate 109, with bond wires 113 formed to couple bond pads on semiconductor die 105 to leads 101, and with mold compound 103 formed covering the semiconductor die 105 and the bond wire 113. FIG. 2 illustrates the elements after molding forms the mold compound 103 and after the package 100 is mounted to a circuit board 120 by solder 121. The device side surface of the semiconductor die 105 is facing away from the package substrate 109. In this example the package substrate 109 is a metal lead frame. Portions of the lead frame form leads 101. Exposed portions of the leads 101 that are not covered by the mold compound 103 form terminals (see 102 in FIG. 1) for package 100. The semiconductor die 105 is coupled to the lead frame by bond wires 113. The bond wires 113 are formed in a wire bonding tool. Mold compound 103 covers the semiconductor die 105, the bond wires 113, and portions of the package substrate 109 and portions of leads 101. The leads can be arranged on either side of the die pad 111, or on all four sides to form a quad package such as a quad flat no lead (QFN) package.

In wire bonding, a wire bonding tool includes a capillary with a bond wire running through it. In useful examples, the bond wire can be copper, palladium coated copper (PCC), gold, silver or aluminum. To begin a wire bond, a "free air" ball is formed on the end of the bond wire as it extend from the capillary by a flame or other heating device directed to the end of the wire. The ball is placed on a conductive bond pad of a semiconductor die and the ball is bonded to the bond pad. Heat, mechanical pressure, and/or sonic energy can be applied to bond the ball to the bond pad. As the capillary moves away from the ball bond on the bond pad, the bond wire extends from the capillary in an arc or curved shape. The capillary moves over a conductive portion of the package substrate, for example a spot on a lead of a lead frame. The capillary in the wire bonder is used to bond the bond wire to the conductive lead, for example a stitch bond can be formed. After the bond is formed to the conductive lead, the wire extending from the stitch bond is cut or broken at the capillary end, and the process starts again by forming another ball on the wire. Automated wire bonders can repeat this process very rapidly, many times per second, to form bond wires. This process is referred to as "ball and stitch" bonding. In an alternative, a ball is first bonded to a lead or other surface. A second ball is formed and bonded to a bond pad on the semiconductor die, and the bond wire is extended to the first ball, and bonded to the ball with a stitch on the ball, this is sometimes referred to as "ball stitch on ball" or "BSOB" bonding. In some example processes, the ball bonds are more reliable than stitch bonds, and the extra ball bonds increase the bond reliability.

Figure 3A:
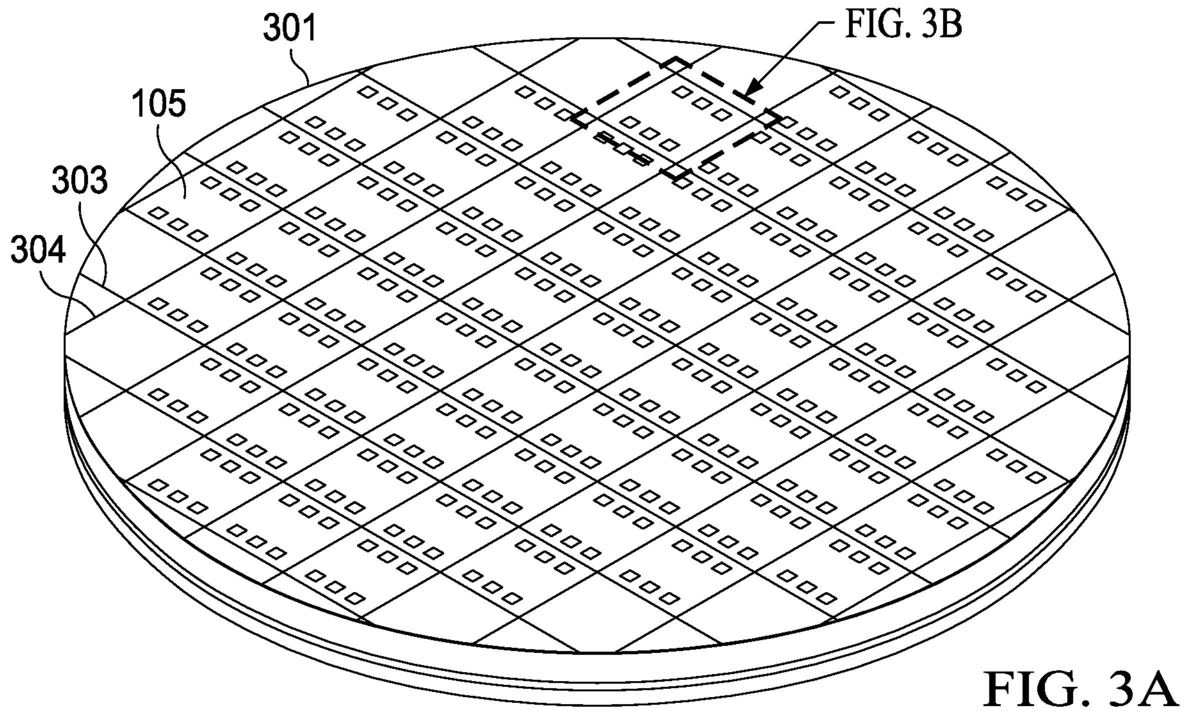
FIGS. 3A-3B illustrate, in a projection view and a close up view, respectively, semiconductor dies on a semiconductor wafer and an individual semiconductor die.
Figure 3B:
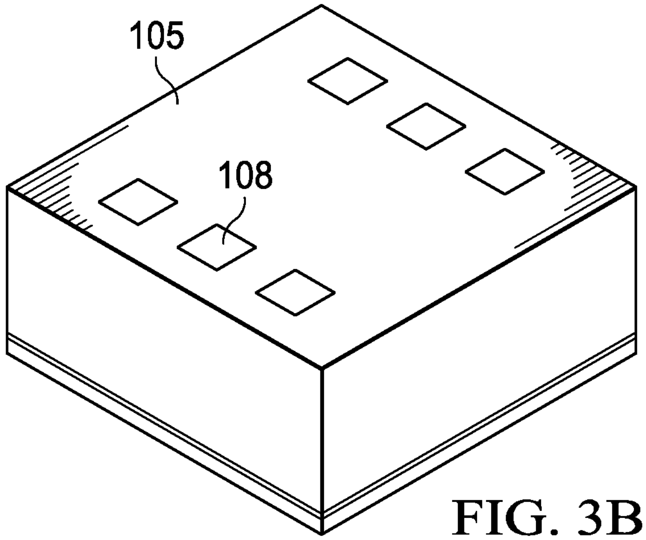

FIGS. 3A-3B illustrate steps used in forming semiconductor dies for wire bonding. In FIG. 3A, a semiconductor wafer 301 is shown with an array of semiconductor dies 105 arranged in rows and columns. The semiconductor dies 105 are formed using manufacturing processes in a semiconductor manufacturing facility, including ion implantation for carrier doping, anneals, oxidation, dielectric and conductor deposition, photolithography, pattern, etch, chemical mechanical polishing (CMP), electroplating, and other processes for making semiconductor devices. Devices are formed on a device side surface of the semiconductor dies. Scribe lanes 303 and 304, which are perpendicular to one another and which run in parallel groups across the wafer 301, separate the rows and columns of the completed semiconductor dies 105, and provide areas for dicing the wafer to separate the semiconductor dies 105 from one another.

FIG. 3B illustrates a single semiconductor die 105, with bond pads 108, which are conductive pads that are electrically coupled to devices (not shown for simplicity) formed in the semiconductor dies 105. The semiconductor dies 105 are separated from wafer 301 by wafer dicing, or are singulated from one another, using the scribe lanes 303, 304 (see FIG. 3A). Wafer dicing can be done by a mechanical saw or by laser cutting along the scribe lanes.

Figure 4A:
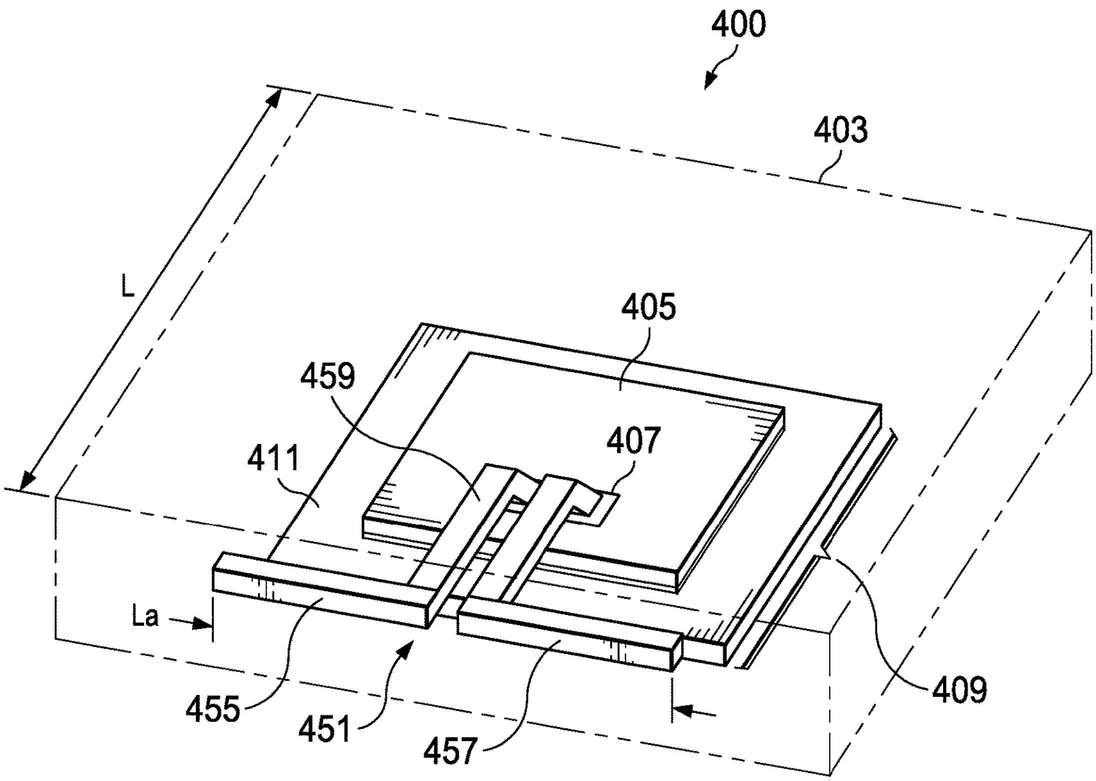
FIGS. 4A-4C illustrate, in a projection view, a cross sectional view, and a top view, a microelectronic device package of an arrangement with an antenna.
Figure 4B:
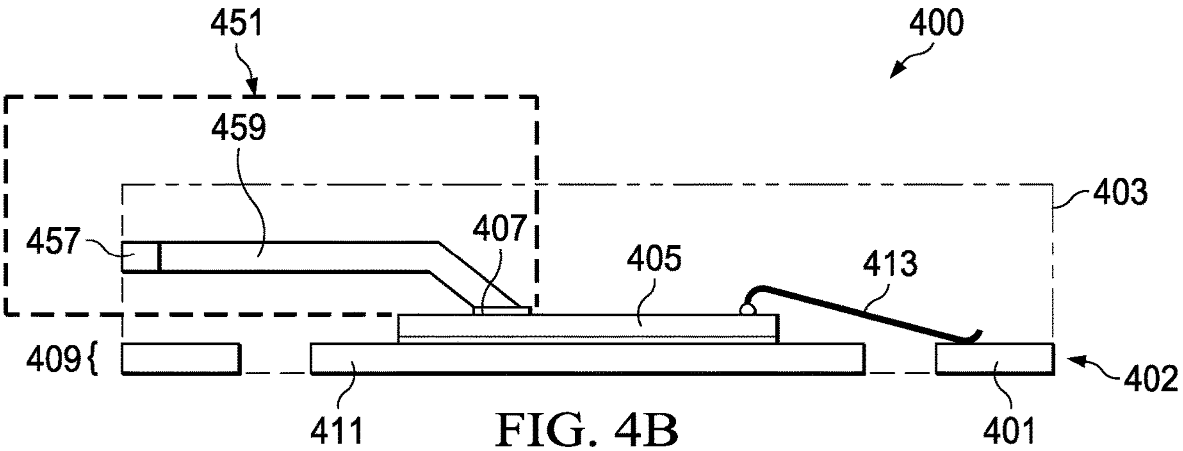
Figure 4C:
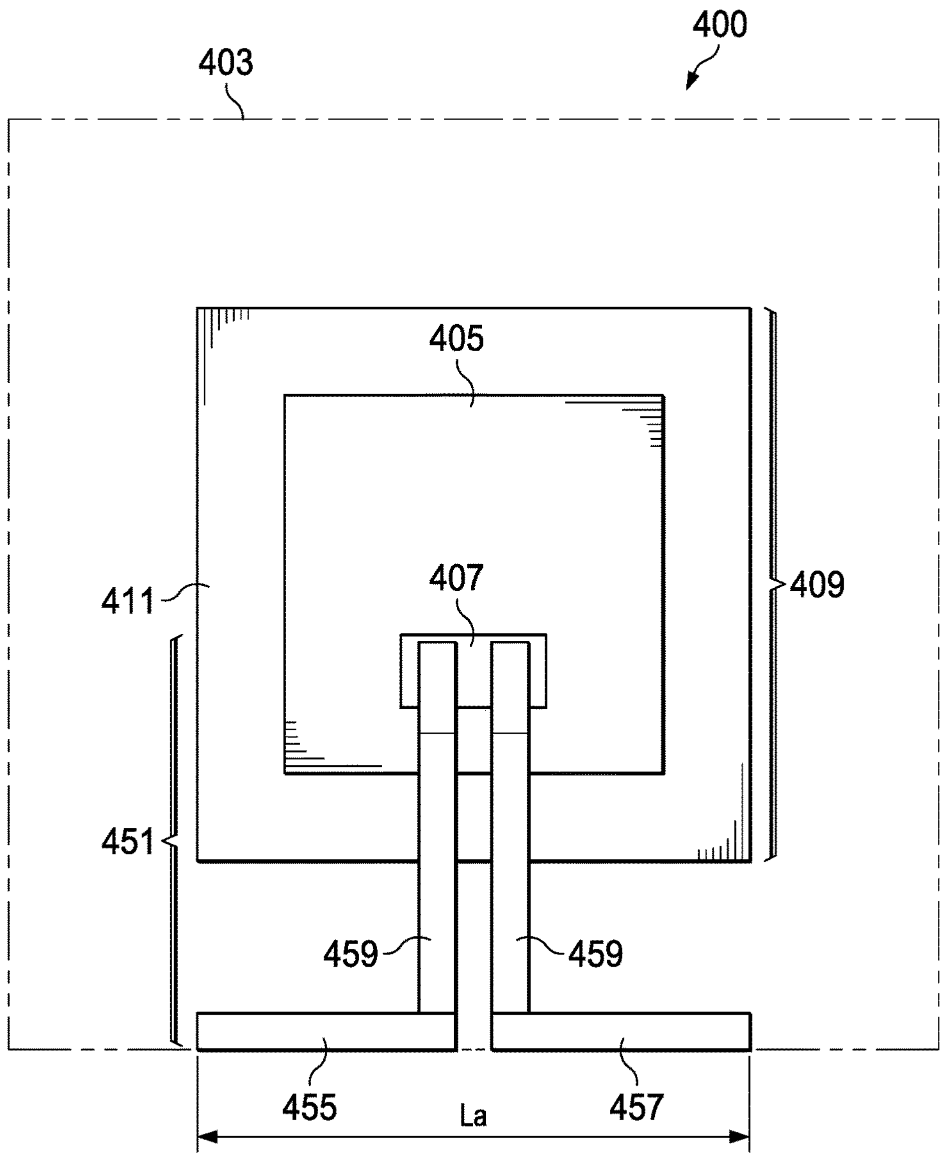

FIGS. 4A-4C show, in a projection view, a cross sectional view, and a top view, an example microelectronic device package of the arrangements.

In FIG. 4A, a package 400 is shown in a projection view with a package substrate 409, in this example a metal lead frame. The metal lead frame can be copper, Alloy 42, stainless steel, steel, or alloys of these. Platings can be formed on the metal lead frame. Die pad 411 is shown with semiconductor die 405 mounted to the die pad 411. Leads are omitted from FIG. 4A, as are the bond wires, however these are shown in FIG. 4B. An antenna 451 is shown coupled to a port 407 on the device side surface of the semiconductor die 405. The antenna 451 shown in the example arrangement of FIGS. 4A-4C is a dipole antenna with two conductors 455, 457 and a center feed line 459. The feed line 459 couples the two conductors to the port 407 on the semiconductor die 405. Mold compound 403 covers the semiconductor die 405 and the die pad 411, and the feed line 459, and portions of the two conductors 455 and 457 of the dipole antenna 451. Importantly, in the various arrangements, the mold compound 403 does not cover at least a surface of each of the conductors 455, 457, so that the antenna 451 can radiate into the air outside of the dielectric material of the mold compound 403. In the illustrated example, the package 400 has a length L of about 5 millimeters, and the dipole antenna has a length La of 3 millimeters as shown on the scale in FIG. 4A, however these can vary with the size of the semiconductor die, and for the antenna, the length La can be varied to tune the antenna to the frequency of interest that is to be radiated, or received, by the antenna 451.

FIG. 4B illustrates the microelectronic device package 400 in a cross sectional view. Mold compound 403 is shown covering the semiconductor die 405 mounted on die pad 411, which is part of the package substrate 409. Package substrate 409 includes leads 401 that are shown coupled to the semiconductor die 405 (connecting to bond pads, not shown for clarity) by bond wires 413. Terminals 402 are formed by a portion of leads 401 that are exposed from the mold compound 403. The dipole antenna 451 has conductor 457, which has a surface exposed from the mold compound 403, and feed line 459, which is coupled to the device side surface of the semiconductor die 405 at port 407, for example by a solder joint. As shown in FIG. 4B, the conductor 457 has a surface exposed from the mold compound 403 that is coextensive with the mold compound 403, that is, the conductor 457 has an exposed surface that is coplanar with the surface of mold compound 403.

The antenna 451 has a length La in this example of 3 millimeters. In the arrangements, the antenna length La is compatible with signals in the millimeter range, which have wavelengths of between 10 and 1 millimeters, for frequencies of 30-300 GHz. The antenna lengths needed to resonate at these frequencies are compatible with microelectronic device package dimensions, which range from about one to several millimeters. The arrangements take advantage of these relationships to integrate antennas into the molded device packages for use at these frequency ranges, which are of increasing importance as 5G networks, automotive radar, and other high frequency applications increase the need for transceivers with antennas that operate in the millimeter wave frequency ranges. By simulating the performance of a given antenna length in the package 400, an appropriate antenna length La can be determined for a desired frequency of interest.

Figure 4D:
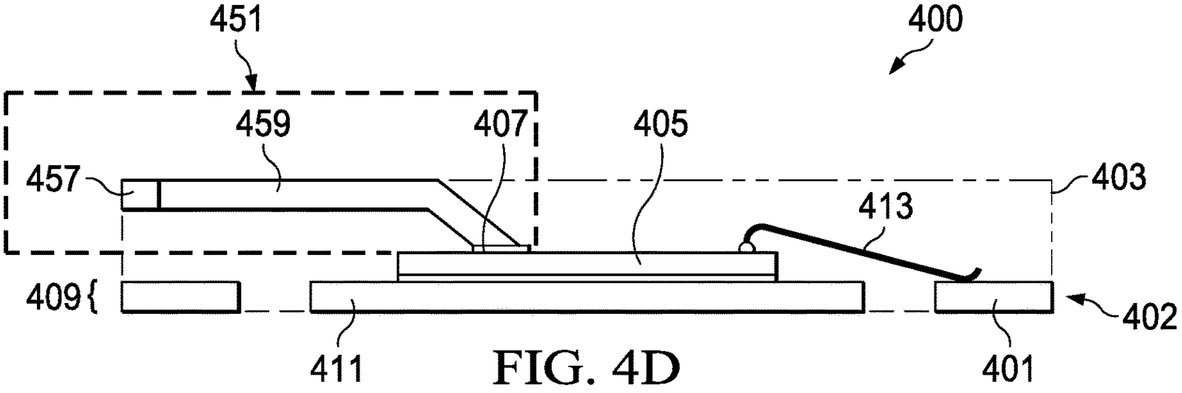
FIG. 4D illustrates, in another cross sectional view, an alternative arrangement.

FIG. 4D illustrates in another cross sectional view, an alternative arrangement. In FIG. 4D, the cross section is similar to and includes all of the elements of FIG. 4B, however the mold compound 403 is thinner and the feed line 459 of the antenna 451 has a surface that is exposed from the mold compound 403. This arrangement forms a thinner package, and will resonate at a different frequency from the example in FIG. 4B, because more of the antenna 451 is exposed to air and will radiate electromagnetic energy. Finite element analysis simulations can be performed to determine the frequency the antenna in FIG. 4D will resonate at, and the length for the antenna La can be adjusted to tune the antenna 451.

Semiconductor die 405 in the example arrangements can be a receiver, a transmitter, or a transceiver configured to transmit or receive signals at the frequencies of interest. Examples include a 5G transceiver operating around 30 GHz.

The antenna shown in the illustrated example is a dipole antenna, however, other antennas such as Vivaldi antennas and patch antennas can be used with the arrangements. The antennas can be formed of copper, aluminum or alloys of these materials. The antennas can be formed of a material such as is used for metal lead frames, having a thickness between 0.1 and 0.4 millimeters.

Figure 5A:
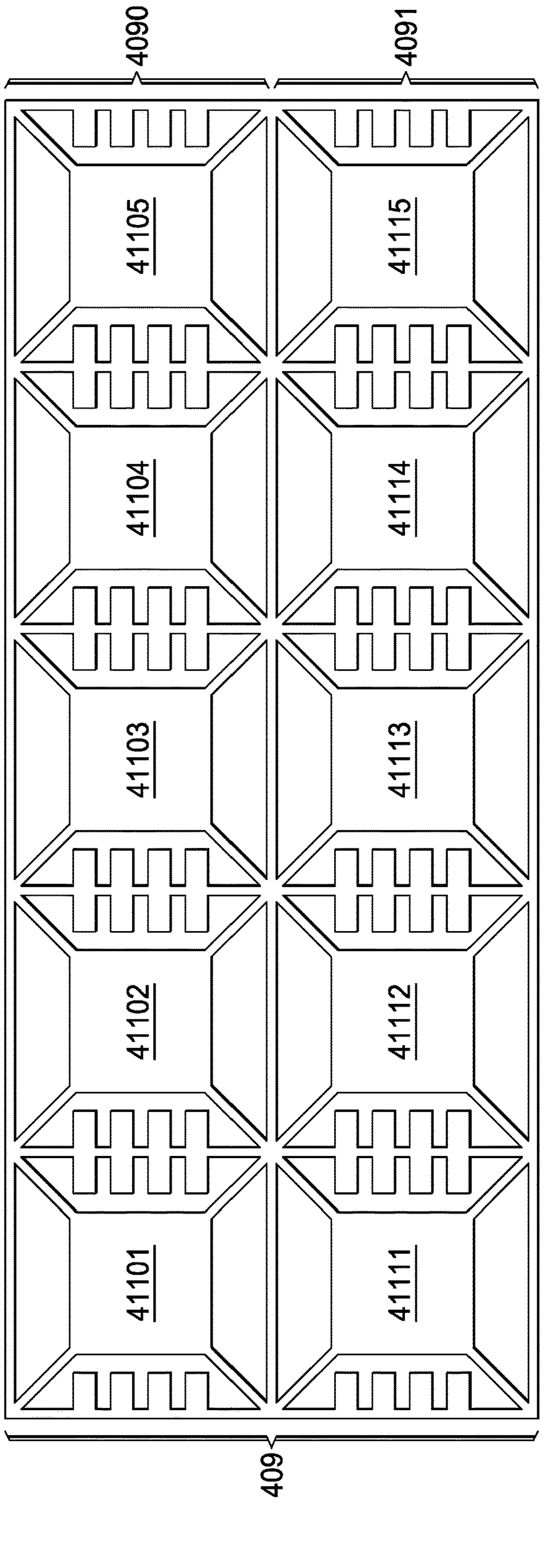
FIGS. 5A-5B illustrate, in plan views, a package substrate of the arrangements.

FIGS. 5A-5F illustrate, in plan views and cross-sectional views, a package substrate and an antenna gang frame for use in forming arrangements. In an aspect of the arrangements, the microelectronic device package with the integrated antenna is formed using a package substrate with an array of unit lead frames, to enable many semiconductor dies and antennas to be packaged simultaneously, lowering costs of production. The elements needed for the simultaneous assembly of the microelectronic device packages of the arrangements are shown in FIGS. 5A-5F. FIG. 5A illustrates, in a plan view, a portion of a package substrate 409. An array of unit lead frames is shown in two rows and five columns, in a production example more unit lead frames can be used, A first row 4090 of the package substrate 409 has unit lead frames with die pads 41101-41105 in five columns, and a second row 4091 has units with die pads 41111-41115 in five columns. The unit lead frames are coupled by material of package substrate 409.

Figure 5B:
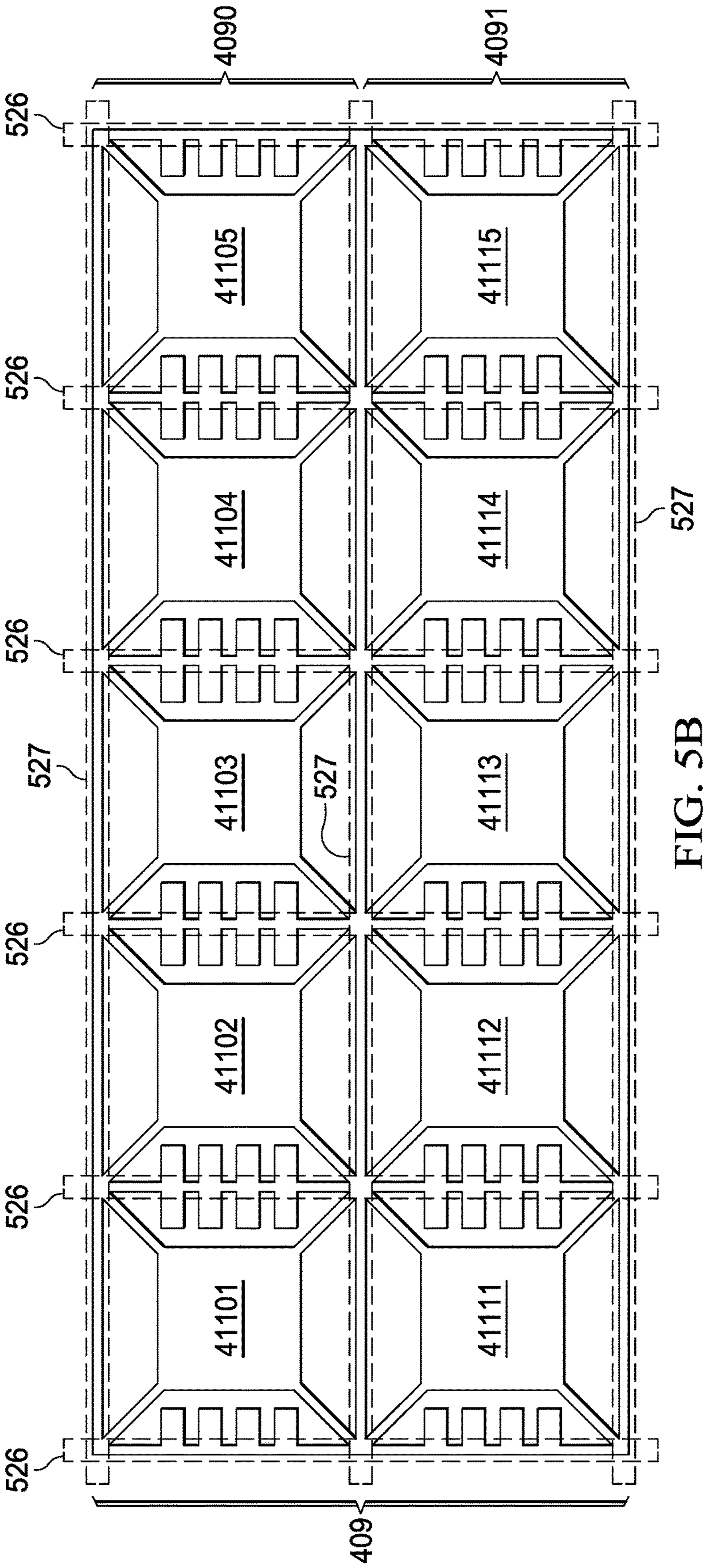

FIG. 5B illustrates the package substrate 409 of FIG. 5A with saw streets 526, in the vertical direction between columns of the unit lead frames, and 527, in the horizontal direction between rows of unit lead frames, illustrating where the unit devices will be singulated after the assemblies are completed. A mechanical saw will cut along the saw streets 526, 527 to separate the unit lead frames from one another.

Figure 5C:
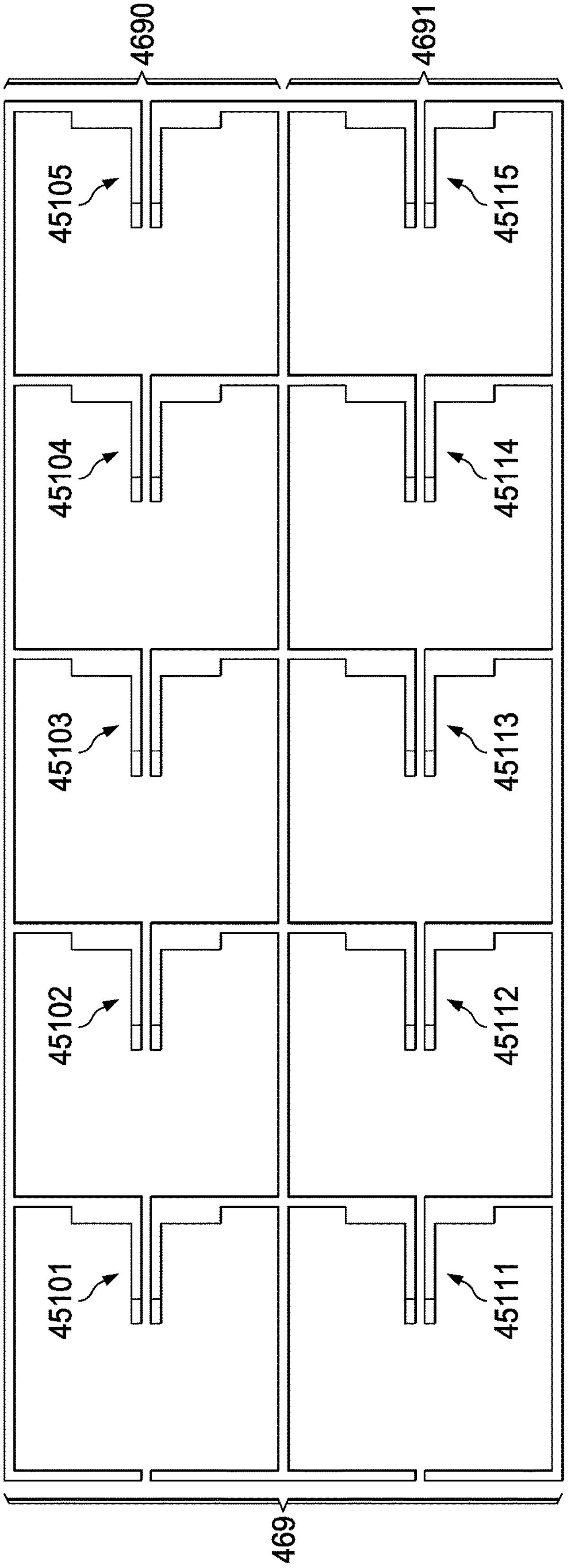
FIGS. 5C-5F illustrate, in plan views and cross sectional views, an antenna gang frame of an arrangement.
Figure 5D:
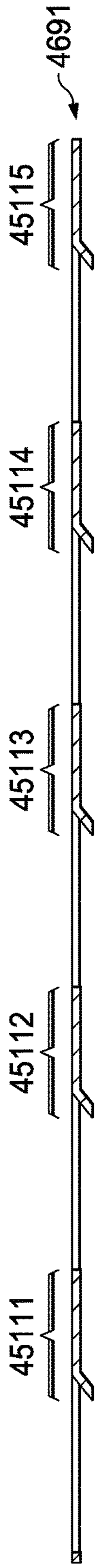

FIG. 5C illustrates in a plan view, and FIG. 5D illustrates in a cross section, the antenna gang frame that is used with the arrangements. In FIG. 5C, an antenna gang frame 469 has two rows 4690, 4691 of antenna material, such as copper or aluminum, the row 4690 has five unit antennas 45101-45105 that correspond to antenna 451 in FIG. 4A. The row 4691 of the antenna gang frame 469 has five unit antennas 45111-45115. The cross section of FIG. 5D illustrates the unit antennas 45111-45115 in a side view, showing the angled portion of the antennas that is used to contact the semiconductor die port, see FIG. 4A.

Figure 5E:
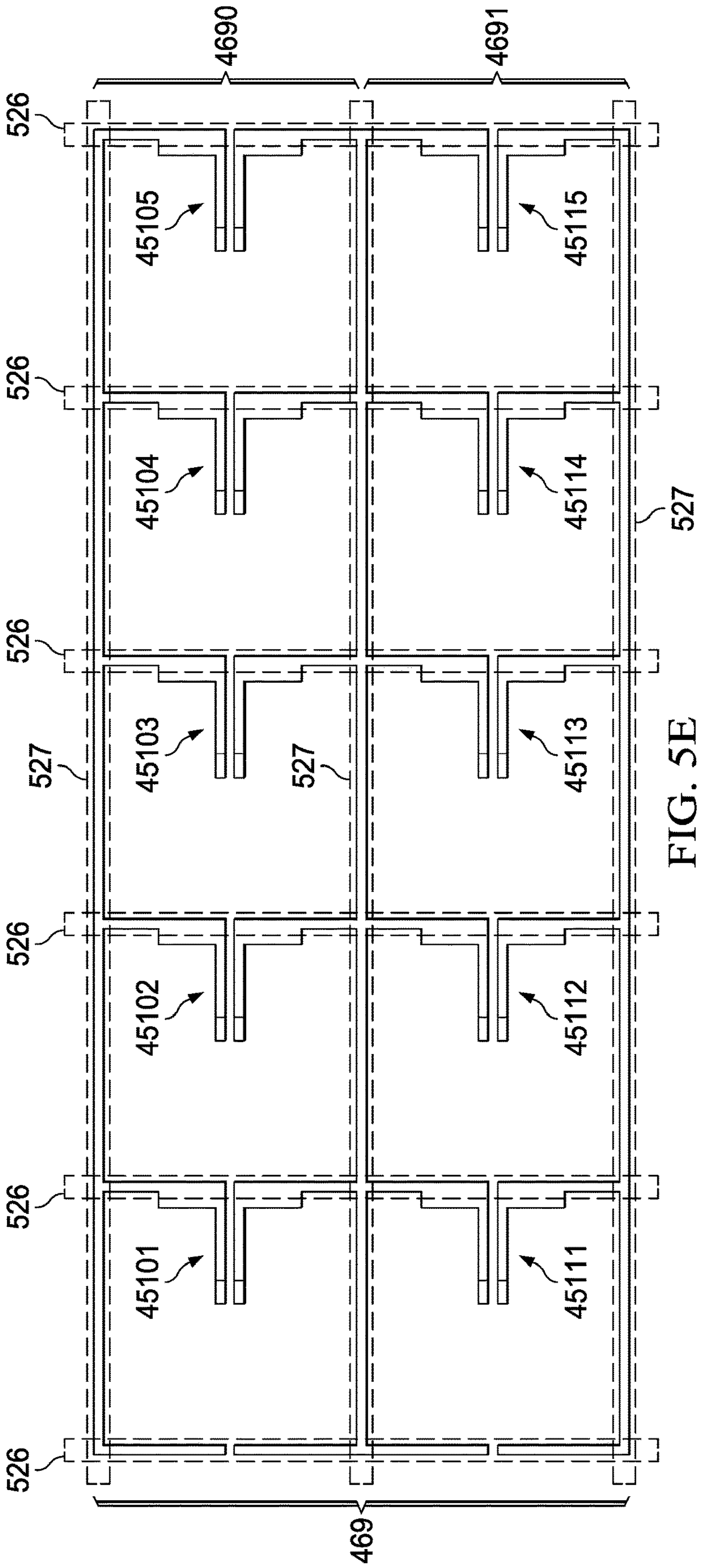
Figure 5F:
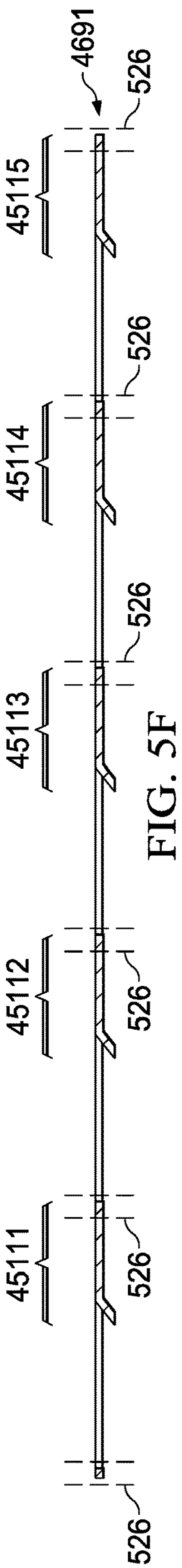

FIGS. 5E and 5F illustrate the antenna gang frame 469 in a plan view and a cross section with the saw streets 526 between the columns of unit antennas, and 527 between the rows of unit antennas. When the microelectronic device packages are completed, the individual units will be separated from one another by a mechanical saw that cuts along the saw streets 526 and 527.

To assemble the microelectronic device packages with the integrated antennas, semiconductor dies are mounted to the package substrate, which in the illustrated examples is a metal lead frame, such as a copper lead frame. The semiconductor dies are mounted to the die pads in the array of unit lead frames using die attach material. Wire bonding forms bond wires that couple bond pads on the semiconductor dies to leads in the unit lead frames. The antenna gang frame is then positioned over the semiconductor dies, and contact is made between an antenna and the port on the device side surface of the semiconductor dies. A solder joint or a conductive epoxy die attach can be formed using a thermal reflow between the port on the semiconductor dies and the antennas. The antennas, the semiconductor dies, and the package substrate are covered in mold compound, which covers a portion of the antennas, leaving at least a surface of the antennas exposed from the mold compound. A singulation process separates the molded devices by sawing along the saw streets between rows and columns of the molded devices to form microelectronic device packages with the integrated antennas.

Figures 6A, 6B, 6C:
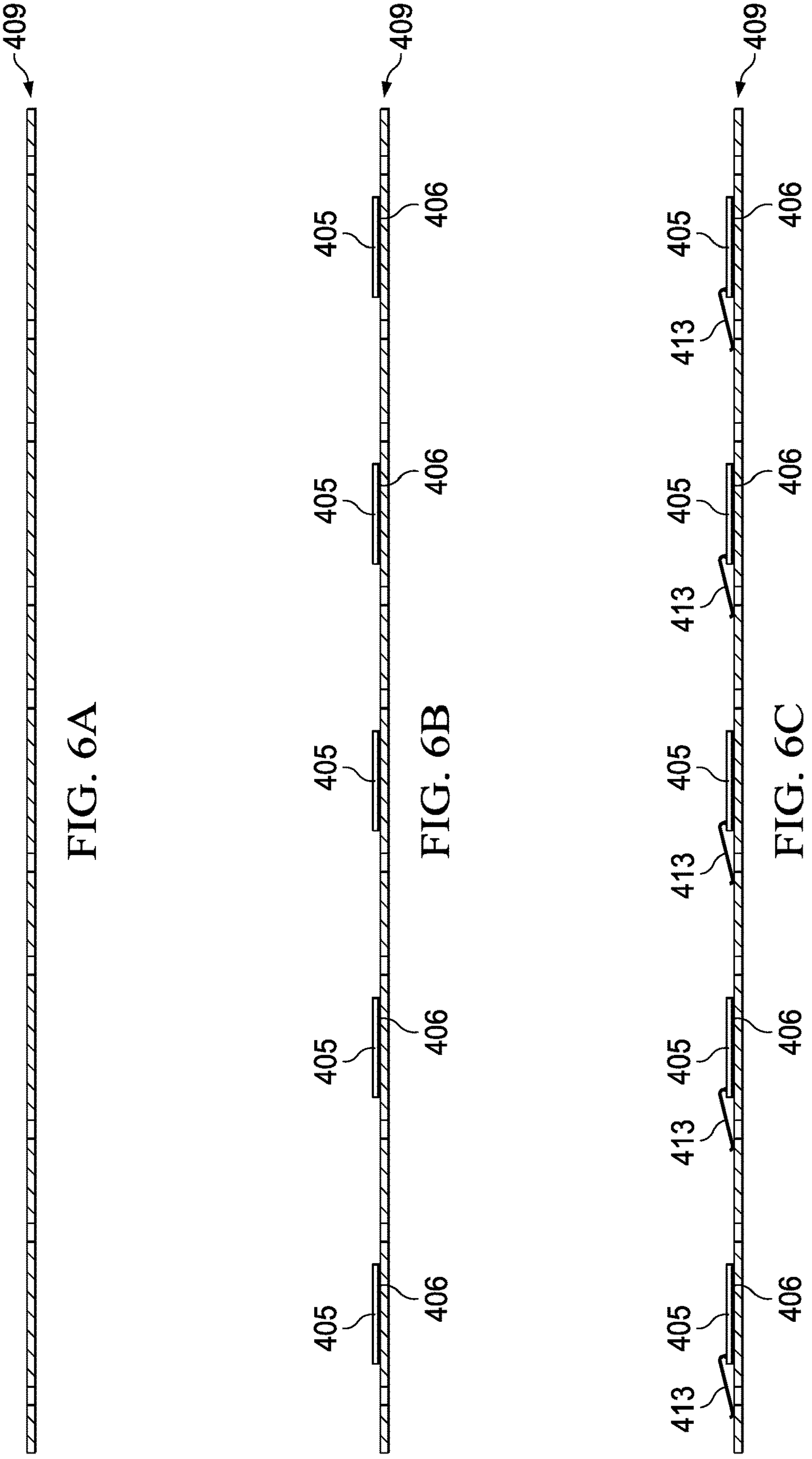
FIGS. 6A-6F illustrate, in a series of cross sectional views, the major steps in manufacturing the arrangements.

FIGS. 6A-6F are a series of cross sections illustrating a method for assembling the microelectronic device packages of the arrangements. In FIG. 6A, a package substrate, such as a metal lead frame, is shown. In FIG. 6B, semiconductor dies 405 are mounted to the package substrate for each unit device using die attach 406. In FIG. 6C, the wire bonding is performed, and wire bonds 413 are shown coupling the semiconductor dies to leads on the package substrate 409 for each of the semiconductor dies.

Figure 6D:
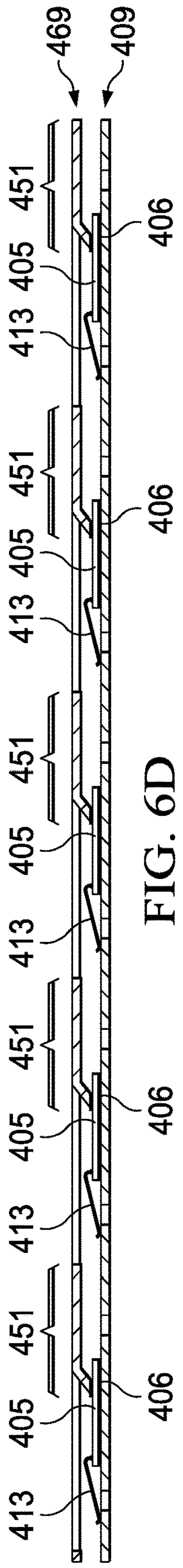

In FIG. 6D, the antenna gang frame 469 is positioned over the device side surface of the semiconductor dies 405, and the antennas 451 are bonded to ports on the semiconductor dies 405 by a solder thermal reflow process to form solder or epoxy die attach joints. The antenna gang frame can be a conductor, such as copper, gold, or another conductor.

Figure 6E:
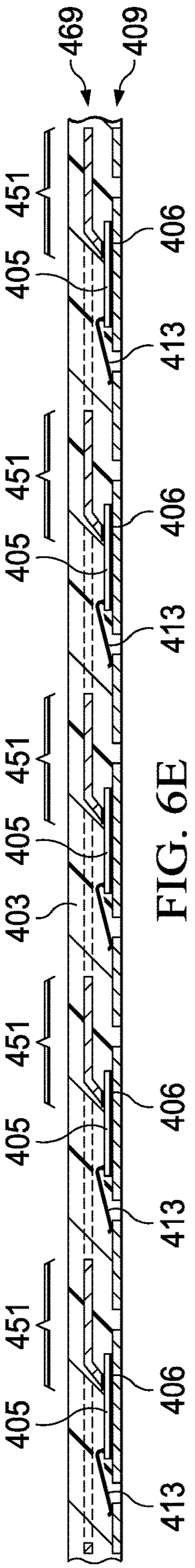

In FIG. 6E, the mold compound 403 is shown formed over the package substrate 409, the semiconductor dies 405, the bond wires 413, and the antennas 451. The mold compound 403 can be formed using transfer molding with a thermoset epoxy resin mold compound, for example.

Figure 6F:
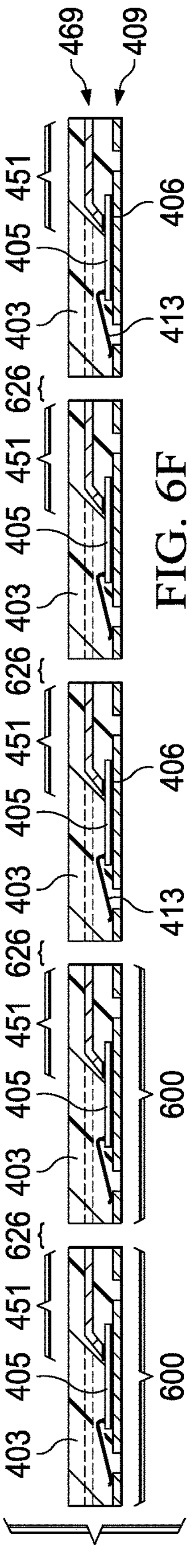

FIG. 6F, the microelectronic device packages 600 are shown separated from one another. The singulation is done by cutting along the saw streets 626. The antennas 451 have a surface exposed from the mold compound, so that electromagnetic energy radiated by the antennas 451 is radiated in air.

Figure 7:
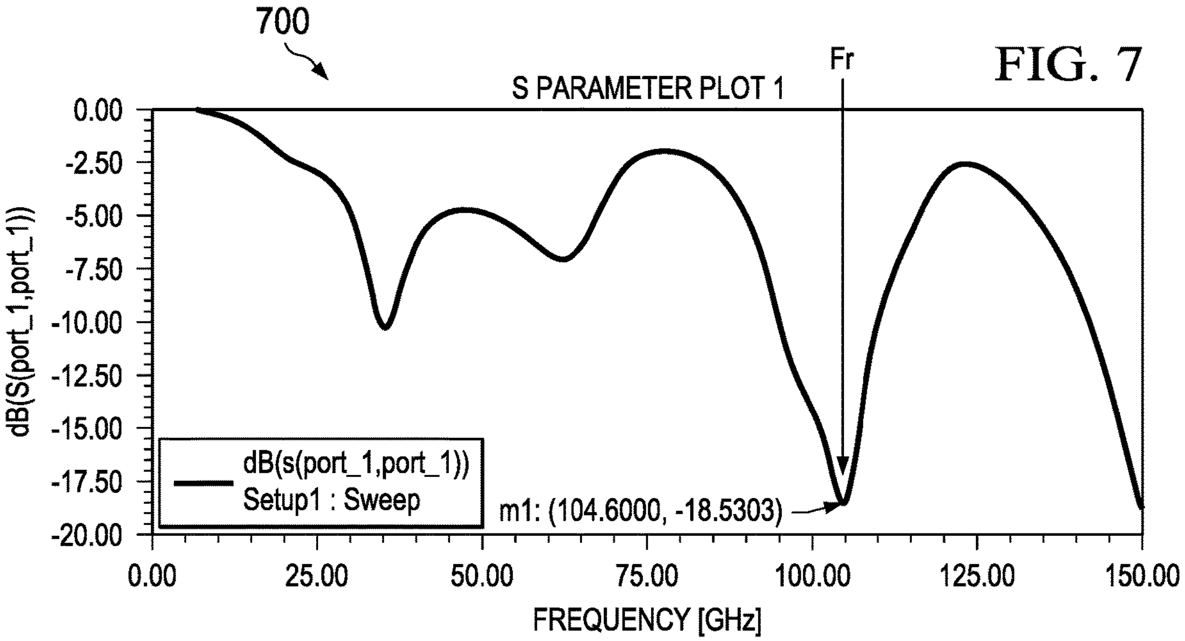
FIG. 7 illustrates, in a graph, a S parameter performance of an arrangement.

FIG. 7 illustrates in a graph 700 a high frequency steady state (HFSS) simulation result for the $S_{11}$ parameter, the reflection coefficient, for the arrangement of FIGS. 4A-4C. Low reflection means that the energy sent to the antenna is being efficiently radiated from the antenna with minimum loss. In graph 700, a minimum of almost −20 dB is shown at a frequency Fr of about 105 GHz, for the antenna having a length La of 3 millimeters. This graph indicates that the dipole antenna of FIGS. 4A-4C is an efficient radiator with almost no reflection, with almost all of the input energy being transmitted at the resonant frequency Fr.

A linear conductor such as a dipole antenna will resonate when the conductor length La satisfies the relationship of Equation 1:

$$La = n\lambda/2, \text{ where } n \text{ is an integer, and } \lambda \text{ is the wavelength of the signal in the medium.} \qquad \text{EQUATION 1.}$$

In determining the antenna length La for an arrangement, finite element analysis simulation can be used that models the antenna 451, the mold compound 403, the semiconductor die 405. The model also determines an effective wavelength λ in the mold compound and in the air, as part of the antenna 451 is in the mold compound. The simulation result shown in graph 700 indicates that for the arrangement of FIG. 4A, the antenna 451 will resonate at 105 GHz when the length La of the dipole antenna 451 is 3 millimeters. As the length increases, the wavelength λ increases, (see Equation 1) and the resonant frequency decreases. Using the simulation models, an antenna length La can be determined for a wide variety of signal frequencies.

Figure 8:
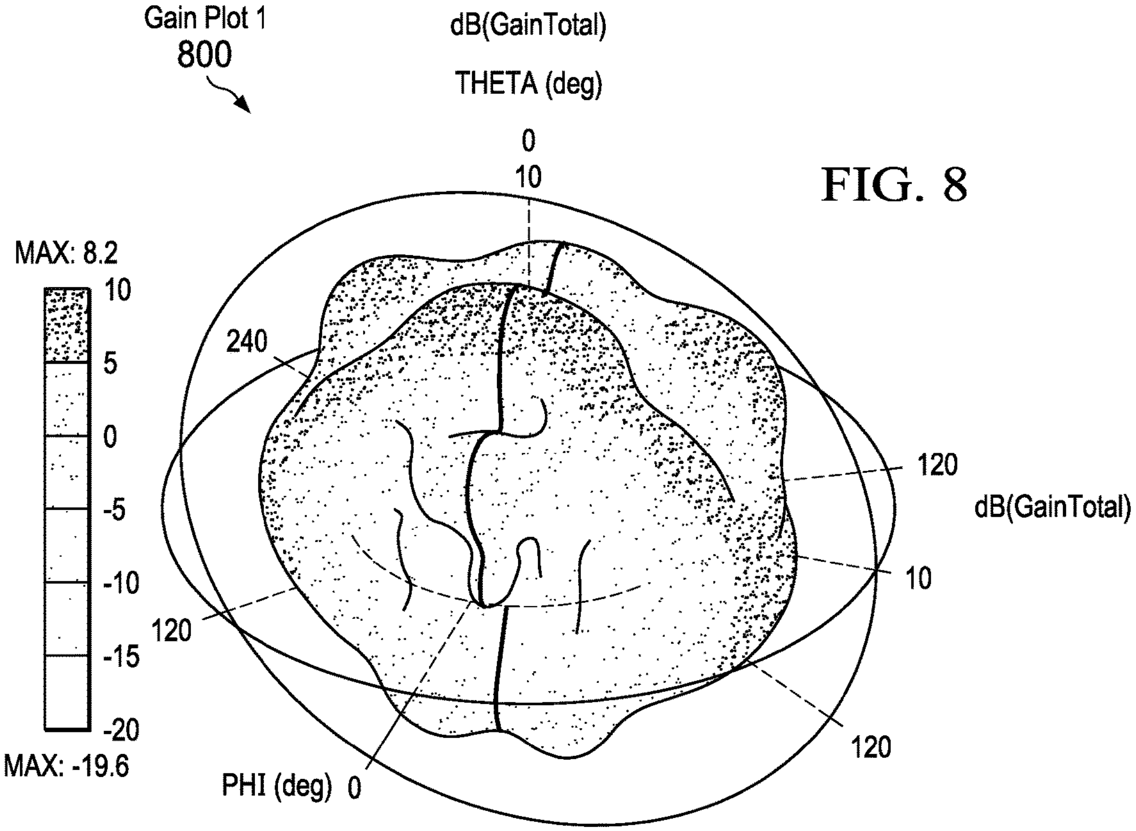
FIG. 8 illustrates, in a plot, a 3D gain diagram of an arrangement.

FIG. 8 illustrates a 3D gain plot 800 for the arrangement shown in FIGS. 4A-4C. The gain plot 800 indicates a strong gain from the dipole antenna with a surface exposed from the mold compound, so that the electromagnetic energy is radiated in air. This plot is evidence that the integrated antenna of the microelectronic device package of the arrangements has good performance, with strong signal gain.

Figure 9A:
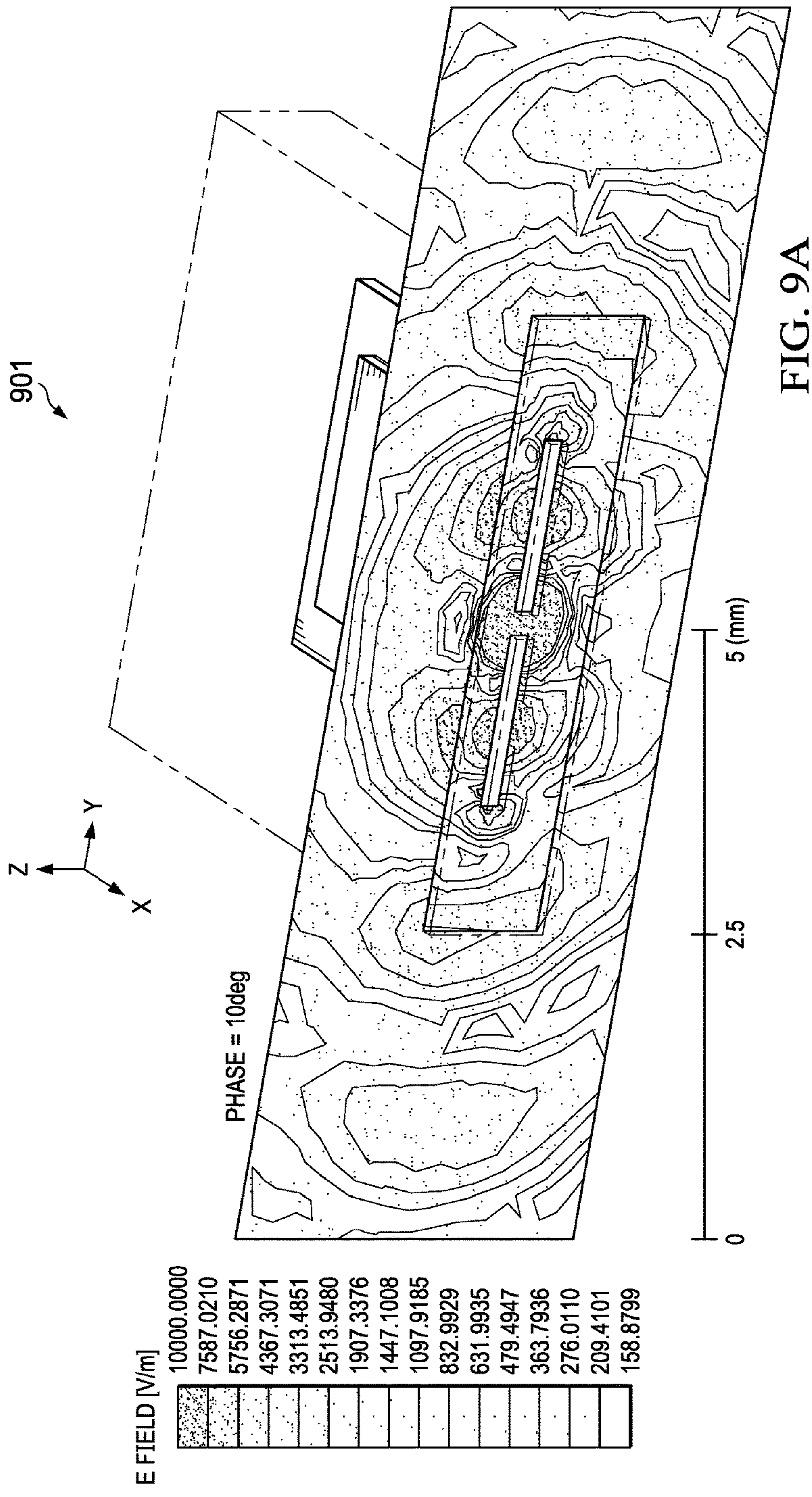
FIGS. 9A-9B illustrate, in graphs, the radiated field strength of an arrangement.
Figure 9B:
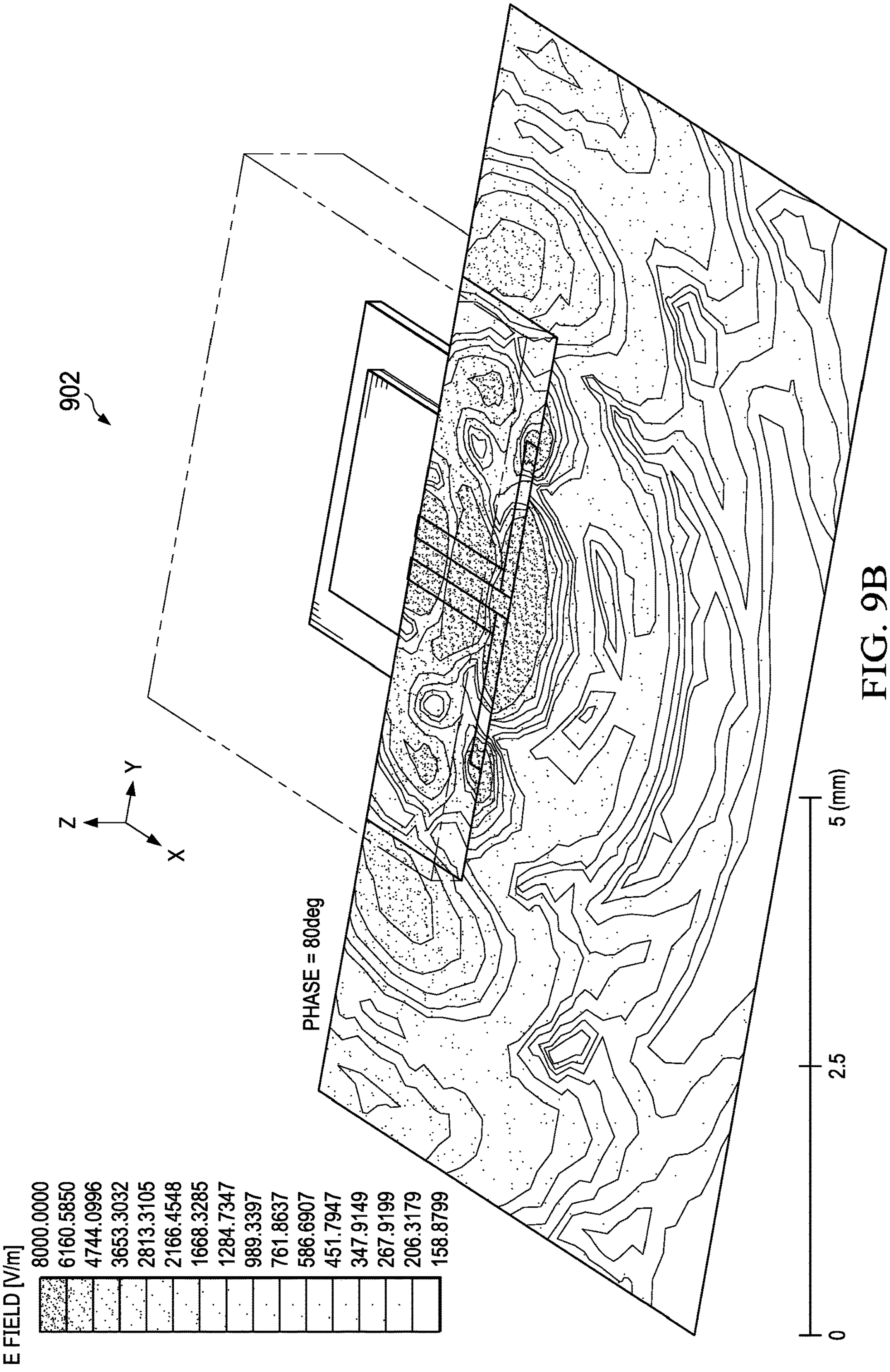

FIGS. 9A-9B illustrate in graphs 801, and 802, the signal envelope for the arrangement shown in FIGS. 4A-4C at two different phase angles, indicating good signal strength from the dipole antenna 451. These graphs indicate that the arrangements including the integrated dipole antenna have good performance, that the signal radiates from the antenna effectively.'

Figure 10:
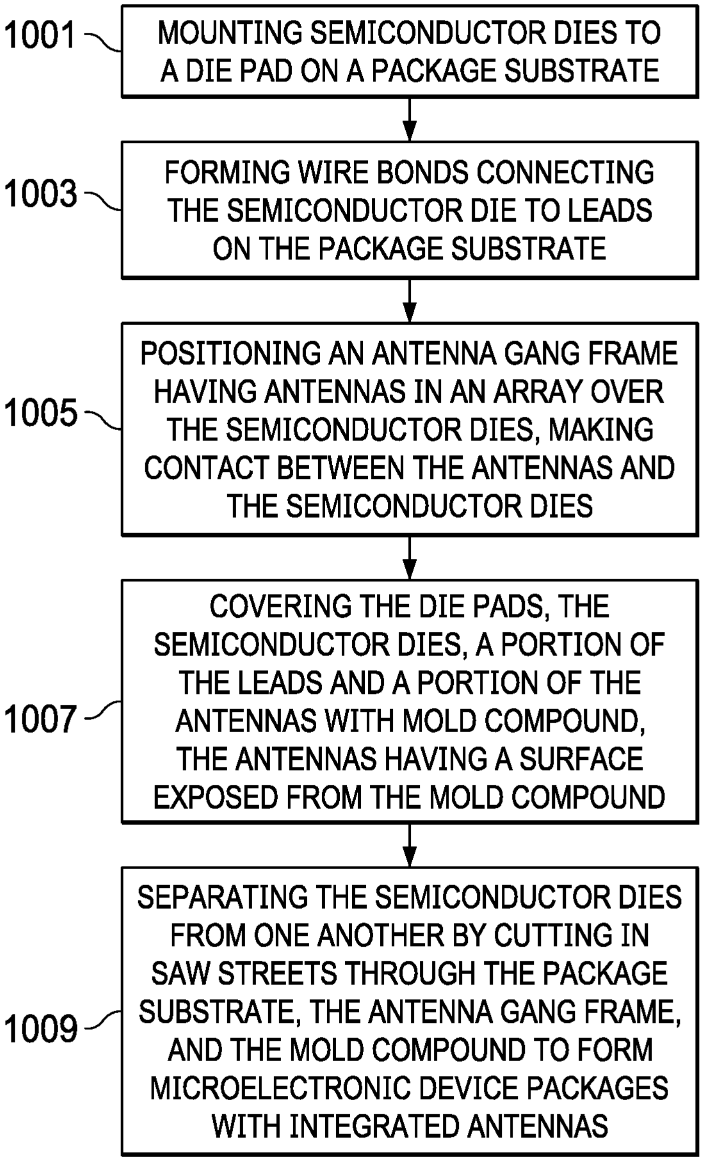
FIG. 10 illustrates in a flow diagram selected steps of a method for forming the arrangements.

FIG. 10 illustrates, in a flow diagram, steps for forming an arrangement.

At step 1001, semiconductor dies are mounted to the die pads on a package substrate (see, for example, semiconductor dies 405 in FIG. 6B). The package substrate can include a strip or array of conductive lead frame portions for individual units (see FIG. 5A-5B).

At step 1003, wire bonds are formed between leads on the package substrate and the semiconductor dies. Wire bonds or ribbon bonds can be used (see, for example, bond wires 413 in FIG. 6C).

At step 1005, an antenna gang frame having antennas in an array is positioned over the semiconductor dies, and contact is made between the antennas and the semiconductor dies (see FIGS. 5C-5D, and FIG. 6D).

At step 1007, the die pads, the semiconductor dies, portions of the leads of the package substrate, and portions of the antennas are covered with mold compound, the antennas having a surface exposed from the mold compound.

At step 1009, the semiconductor devices are separated from one another by sawing through saw streets between the packaged semiconductor devices, cutting through the package substrate, the antenna gang frame and the mold compound to form microelectronic device packages with integrated antennas.

The use of the arrangements provides a microelectronic device package with an integrated antenna. Existing materials and assembly tools are used, and the arrangements are low in cost when compared to solutions using additional circuit boards or modules to carry the antennas. The arrangements are formed using existing methods, materials and tooling for making the devices and are cost effective.

Modifications are possible in the described arrangements, and other alternative arrangements are possible within the scope of the claims.

What is claimed is:

1. An apparatus, comprising:

a semiconductor die mounted to a die pad of a package substrate, the semiconductor die having a bond pad on a device side surface facing away from the die pad;

a bond wire coupling the bond pad to a lead of the package substrate, the lead spaced from the die pad;

an antenna including a first conductor and a first feed line, a portion of the first feed line coupled to the device side surface of the semiconductor die; and mold compound covering portions of the semiconductor die, the bond wire, the lead, and the antenna, wherein a surface of the first conductor is exposed on a surface of the mold compound.

2. The apparatus of claim 1, wherein the device side surface includes a port.

3. The apparatus of claim 2, wherein the portion of the first feed line is coupled to the port.

4. The apparatus of claim 3, wherein the portion of the first feed line is coupled to the port via solder.

5. The apparatus of claim 1, wherein the antenna comprises a dipole antenna.

6. The apparatus of claim 1, wherein the antenna comprises a dipole antenna, a Vivaldi antenna, or a patch antenna.

7. The apparatus of claim 1, wherein the antenna comprises copper or aluminum or an alloy thereof.

8. The apparatus of claim 1, wherein the surface of the first conductor is exposed from the mold compound on a side surface of the apparatus.

9. The apparatus of claim 8, wherein the surface of the first conductor is coplanar with a plane along the side surface of the apparatus.

10. The apparatus of claim 1, wherein the antenna comprises a second conductor and a second feed line coupled to the second conductor, a surface of the second conductor exposed from the mold compound.

11. The apparatus of claim 1, wherein the semiconductor die is a transmitter, a receiver, or a transceiver of signals that have a frequency greater than 10 GHz.

12. The apparatus of claim 1, wherein the apparatus is a quad flat no-lead (QFN) package.

13. An apparatus, comprising:

a semiconductor die mounted to a die pad of a package substrate, the semiconductor die having a bond pad on a device side surface facing away from the die pad;

a bond wire coupling the bond pad to a lead of the package substrate, the lead spaced from the die pad;

an antenna including a first conductor coupled to a first feed line, and a second conductor coupled to a second feed line, a portion of the first feed line coupled to the device side surface of the semiconductor die, and a portion of the second feed line coupled to the device side surface of the semiconductor; and mold compound covering portions of the semiconductor die, the bond wire, the lead, and the antenna, wherein a surface of the first conductor and a surface of the second conductor are exposed from the mold compound, and wherein a surface of the first feed line and a surface of the second feed line are exposed from the mold compound.

14. The apparatus of claim 13, wherein the surface of the first conductor and the surface of the second conductor are exposed from a side surface of the apparatus.

15. The apparatus of claim 13, wherein the surface of the first feed line and the surface of the second feed line are exposed from a top surface of the apparatus.

16. The apparatus of claim 13, wherein the antenna comprises a dipole antenna.

17. The apparatus of claim 13, wherein the semiconductor die is a transmitter, a receiver, or a transceiver of signals that have a frequency greater than 10 GHz.

18. The apparatus of claim 13, wherein the apparatus is a quad flat no-lead (QFN) package.

* * * * *